US009805506B2

(12) United States Patent
Therien et al.

(10) Patent No.: US 9,805,506 B2
(45) Date of Patent: Oct. 31, 2017

(54) PHYSICAL 3D RENDERER

(71) Applicant: Microsoft Corporation, Redmond, WA (US)

(72) Inventors: Patrick Therien, Bothell, WA (US); Michael Sinclair, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 681 days.

(21) Appl. No.: 14/200,950

(22) Filed: Mar. 7, 2014

(65) Prior Publication Data
US 2015/0254898 A1   Sep. 10, 2015

(51) Int. Cl.
| | |
|---|---|
| G06T 19/00 | (2011.01) |
| G06F 3/00 | (2006.01) |
| G09B 25/06 | (2006.01) |
| G09B 5/06 | (2006.01) |
| G09B 21/00 | (2006.01) |

(52) U.S. Cl.
CPC .............. *G06T 19/00* (2013.01); *G06F 3/00* (2013.01); *G09B 5/06* (2013.01); *G09B 21/003* (2013.01); *G09B 25/06* (2013.01)

(58) Field of Classification Search
CPC ..... G06T 19/00; G09B 21/003–21/005; G09B 25/06
USPC ........................................................ 345/419
See application file for complete search history.

(56) References Cited

U.S. PATENT DOCUMENTS

| | | | |
|---|---|---|---|
| 2003/0151597 A1 | 8/2003 | Roberts et al. | |
| 2004/0223630 A1* | 11/2004 | Waupotitsch | G06K 9/00275 382/118 |
| 2013/0009943 A1 | 1/2013 | Li et al. | |
| 2013/0301907 A1* | 11/2013 | Shim | G01B 11/02 382/154 |
| 2015/0123973 A1* | 5/2015 | Larsen | G06T 15/04 345/427 |

OTHER PUBLICATIONS

Sarah Griffiths; "The hi-tech tabletop that creates a 3D version of YOU that moves in realtime"; , DailyMail.com, Nov. 7, 2013, which references "state-of-the-art shape display" of "inFORM: Dynamic Physical Affordances and Constraints through Shape and Object Actuation";Sean Follmer, Daniel Leithinger, Alex Olwal, Akimitsu Hogge and Hiroshi Ish.*

(Continued)

*Primary Examiner* — Daniel Hajnik
(74) *Attorney, Agent, or Firm* — Katrina A. Lyon; Lyon & Harr, LLP (57) ABSTRACT

The physical 3D renderer described herein renders one or more captured depth images as a physical 3D rendering. The physical 3D renderer can render physical 3D surfaces and structures in real time. In one embodiment the 3D renderer creates a physical three dimensional (3D) topological surface from captured images. To this end, a depth image of a surface or structure to be replicated is received (for example from a depth camera or depth sensor). Depth information is determined at a dense distribution of points corresponding to points in the depth image. In one embodiment the depth information corresponding to the depth image is fed to actuators on sliding shafts in an array. Each sliding shaft is adjusted to the depth in the depth image to create a physical 3D topological surface like the surface or structure to be replicated.

20 Claims, 6 Drawing Sheets

(56) References Cited

OTHER PUBLICATIONS

Shahram Izadi; "KinectFusion: Real-time 3D Reconstruction and Interaction Using a Moving Depth Camera"; UIST'11, Oct. 16-19, 2011, Santa Barbara, CA, USA. Copyright 2011.*
Sean Follmer, Daniel Leithinger, Alex Olwal, Akimitsu Hogge and Hiroshi Ishii; "inFORM: Dynamic Physical Affordances and Constraints through Shape and Object Actuation"; MIT Media Lab; UIST'13, Oct. 8-11, 2013, St. Andrews, United Kingdom. Copyright is held by the owner/author(s). Publication rights licensed to ACM.*
Sean Follmer, Daniel Leithinger, Alex Olwal, Nadia Cheng, and Hiroshi Ishii;"Jamming User Interfaces: Programmable Particle Stiffness and Sensing for Malleable and Shape-Changing Devices"; UIST'12, Oct. 710, 2012, Cambridge, Massachusetts, USA.*
Andrew Maimone, Henry Fuchst; "Encumbrance-Free Telepresence System with Real-Time 3D Capture and Display using Commodity Depth Cameras"; IEEE International Symposium on Mixed and Augmented Reality 2011 Science and Technolgy Proceedings Oct. 28-29, Basel; Switzerland.*
Ki-Uk Kyung and Dong-Soo Kwon;"Tactile Displays with Parallel Mechanism"; * Electronics and Telecommunications Research Institute(ETRI) *Korea Advanced Institute of Science and Technology(KAIST);Parallel Manipulators, New Developments, Book edited by: Jee-Hwan Ryu, ISBN 978-3-902613-20-2, pp. 498, Apr. 2008, I-Tech Education and Publishing, Vienna.*
Leithinger, Daniel, et al. "Direct and gestural interaction with relief: a 2.5 D shape display." Proceedings of the 24th annual ACM symposium on User interface software and technology. ACM, 2011.*
Yang, Gi-Hun, et al. "Quantitative tactile display device with pin-array type tactile feedback and thermal feedback." Robotics and Automation, 2006. ICRA 2006. Proceedings 2006 IEEE International Conference on. IEEE, 2006.*
Follmer, Sean, et al. "Jamming user interfaces: programmable particle stiffness and sensing for malleable and shape-changing devices." Proceedings of the 25th annual ACM symposium on User interface software and technology. ACM, 2012.*
Benko, et al., "MirageTable: Freehand Interaction on a Projected Augmented Reality Tabletop", In Proceedings of the SIGCHI Conference on Human Factors in Computing Systems, May 5, 2012, pp. 199-208.
Follmer, et al., "inFORM: Dynamic Physical Affordances and Constraints through Shape and Object Actuation", In Proceedings of the 26th Annual ACM Symposium on User Interface Software and Technology, Oct. 8, 2013, pp. 417-426.
Izadi, et al., "Kinect Fusion: Real-Time 3D Reconstruction and Interaction Using a Moving Depth Camera", In Proceedings of the 24th Annual ACM Symposium on User Interface Software and Technology, Oct. 16, 2011, pp. 559-568.
Kuthirummal, et al., "Flexible Mirror Imaging", In IEEE 11th International Conference on Computer Vision, Oct. 14, 2007, pp. 1-8.
Leithinger, et al., "INFORM", Published on: Nov. 17, 2013, Available at: http://tangible.media.mit.edu/project/inform/, pp. 1-2.
Wagner, et al., "A Tactile Shape Display Using RC Servomotors", In 10th Symposium on Haptic Interfaces for Virtual Environment and Teleoperator Systems, Mar. 24, 2002, pp. 354-355.
"International Search Report and Written Opinion Issued in PCT Application No. PCT/US2015/017871", Mailed Date: Feb. 24, 2016, 16 Pages.
Ivan, et al., "Lumen: Interactive Visual and Shape Display for Calm Computing", In Proceedings of ACM 2004 Emerging Technologies, Jan. 1, 2004, 1 Page.
Iwata, et al., "Project Feelex: Adding Haptic Surface to Graphics", In Proceedings of 28th annual conference on Computer graphics, Aug. 12, 2001, 7 Pages.
Kyung, et al., "Tactile Displays with Parallel Mechanism", In Proceedings of Publication of Parallel Manipulators, New Developments, Apr. 1, 2008, 13 Pages.
King, et al., "Optimization of a Pneumatic Balloon Tactile Display for Robot-Assisted Surgery Based on Human Perception", In Proceedings of IEEE Transactions on Biomedical Engineering, vol. 55, Issue 11, Nov. 1, 2008, 7 Pages.
Sharma, et al., "Zixel: A 2.5-D Graphical Tactile Display System", In Proceedings of Siggraph Asia 2011, Sep. 2011, 3 Pages.
"Motion control", Available at: <<https://en.wikipedia.org/w/index.php?title=Motion control&oldid=590825214>>, Jan. 15, 2014, 3 Pages.
Gao, Miao, Notice of Transmittal of International Preliminary Report on Patentability, Jul. 18, 2016, PCT/US2015/017871, pp. 1-16.

* cited by examiner

PHYSICAL 3D RENDERER

BACKGROUND

In computer graphics, three dimensional (3D) modeling is the process of developing a mathematical representation of a three dimensional object via specialized software that defines the surfaces of the object as a 3D model in mathematical terms. The 3D model can be displayed on a computer display as a two-dimensional image through a process called 3D rendering.

Models for 3D computer modeling can be manually or automatically created and usually represent a 3D object using points in space connected by geometric shapes.

3D models are useful in many diverse fields because they allow for the visualization of complex objects in a cost effective and timely manner. For example, the motion picture and entertainment industry uses 3D models to create animated characters for motion pictures and computer games, while the medical industry uses models to create detailed models of organs. Chemists often model chemical compounds and the engineering community also often models prototypes of new devices and structures. In addition to these applications for 3D models, 3D geographic models have been used by the earth science community for many years.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The physical 3D renderer described herein renders one or more captured images as a physical 3D rendering. The physical 3D renderer can render physical 3D surfaces and structures in real time. In one embodiment the 3D renderer creates a physical 3D topological surface from captured images. To this end, a depth image of a surface or structure to be replicated is received (for example from a depth camera or depth sensor). Depth information is determined at a dense distribution of points corresponding to points in the depth image. In one embodiment the depth information corresponding to the depth image is fed to actuators on sliding shafts in an array. Each sliding shaft is adjusted to a depth corresponding to the depth image to create a physical 3D topological surface like the surface or structure being replicated.

In one embodiment of the physical 3D renderer, the physical 3D rendering of an image is created by an array of air jets that are covered with a skin. In this embodiment of the physical 3D renderer a depth image of a structure or surface to be replicated is received. Depth information is determined at a dense distribution of points corresponding to points in the depth image. The depth information is fed to an array of air jets that are covered with a skin and the pressurized air streams output by each air jet in the array are adjusted based on this depth information to deflect the surface of the skin to create the 3D topological structure that mirrors the structure or surface being replicated. Similarly, in some embodiments of the 3D renderer pressurized gas can be fed into an array of bladders or balloons that is covered with a skin. The balloons can be inflated and deflated to create a specific 3D shape.

The rendered topology can be verified to obtain greater accuracy by using a second depth camera (or additional depth cameras or sensors) to observe the front or back side of the rendered surface and to compare this with the image captured by the first depth camera. Depth discrepancies between images taken from the cameras can be used to adjust the created 3D topological surface accordingly.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the physical 3D renderer, reference is made to the accompanying drawings, which form a part thereof, and which show by way of illustration examples by which the physical 3D renderer described herein may be practiced. It is to be understood that other embodiments may be utilized and structural changes may be made without departing from the scope of the claimed subject matter.

1.0 PHYSICAL 3D RENDERER

The following sections provide an introduction to the physical 3D renderer, as well as exemplary embodiments of processes and a system for practicing the physical 3D renderer. Details of various embodiments and components of the real-time physical 3D renderer are also provided.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Introduction

The physical 3D renderer described herein can create a 3D topological structure or surface based on real-time image (e.g., depth image) feedback. In one embodiment the 3D topological structure mimics a 3D mirror where a person walks up to it and their depth "image" is rendered by, for example, an array of shafts or posts that vary in height according to the height of the features of their face.

Figure 1:
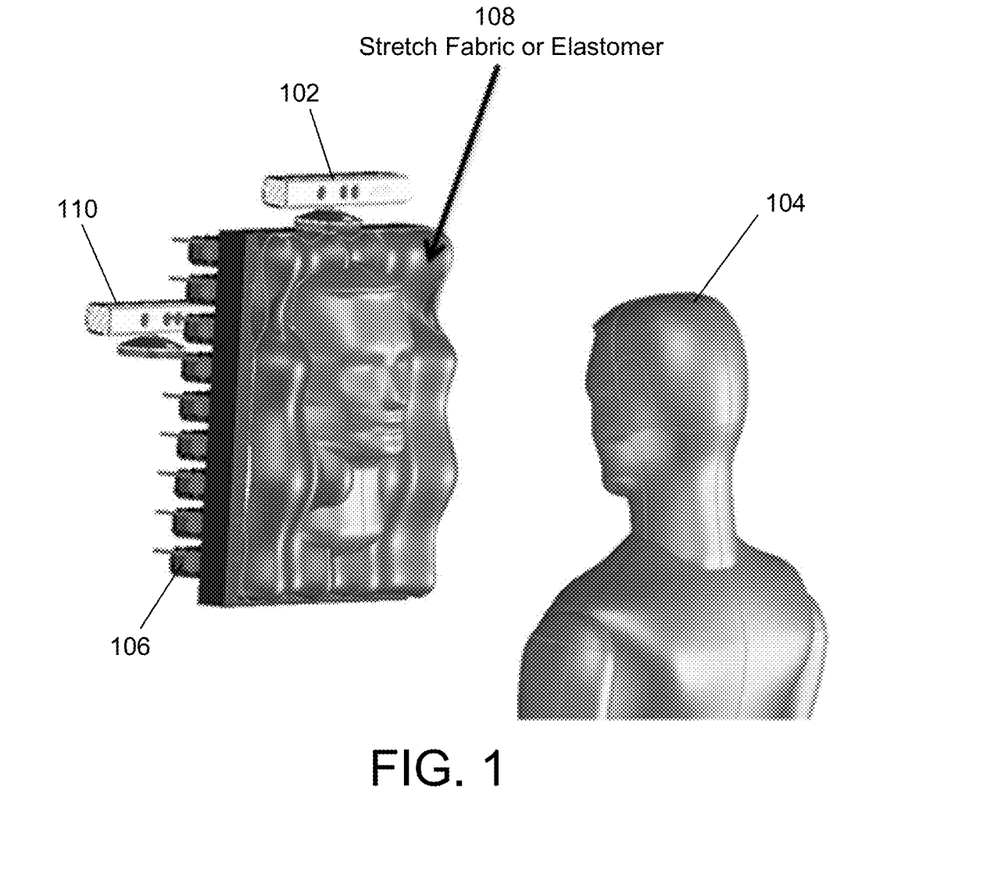
FIG. 1 depicts a schematic of one embodiment of how the physical 3D renderer can be employed to create a physical 3D topological structure or surface that mirrors a surface being replicated.

FIG. 1 provides a depiction of how one embodiment of the physical 3D renderer could be employed. As shown in FIG. 1, a first camera system 102 captures a depth image of a surface or structure to be replicated. In this depiction the first camera 102 captures a depth image of a frontal view of a person's head 104. Depth information from the depth image is fed to actuators on sliding shafts or posts in an array 106. Each shaft/post height varies with the depth of a feature captured by the first camera system.

Many variations of the embodiment shown in FIG. 1 are possible. For example, the sliding shafts/posts of the array can be covered with a skin, such as a stretch fabric or elastomer 108.

Furthermore, a second camera 110 can be used to verify the depth of the sliding shafts (from the back of the array, for example). To this end depth image/information is captured by the second camera 110 and is compared to the depth image of the surface to be replicated (e.g., the person's head 104) taken by the first depth camera 102 to verify that depth of the shafts accurately mimic the surface to be replicated. If discrepancies exist, the depth of the sliding shafts can be adjusted.

The first camera 102 and the surface to be replicated 104 are typically co-located but the created physical 3D topological structure/surface and the second camera 110 can be remotely located from the surface to be replicated 104. Data from the location of the first camera/surface to be replicated can be transferred to the remote location using a network (not shown).

1.2.3 Exemplary Processes for Practicing the Physical 3D Renderer

The following paragraphs described various exemplary processes for practicing the physical 3D renderer.

Figure 2:
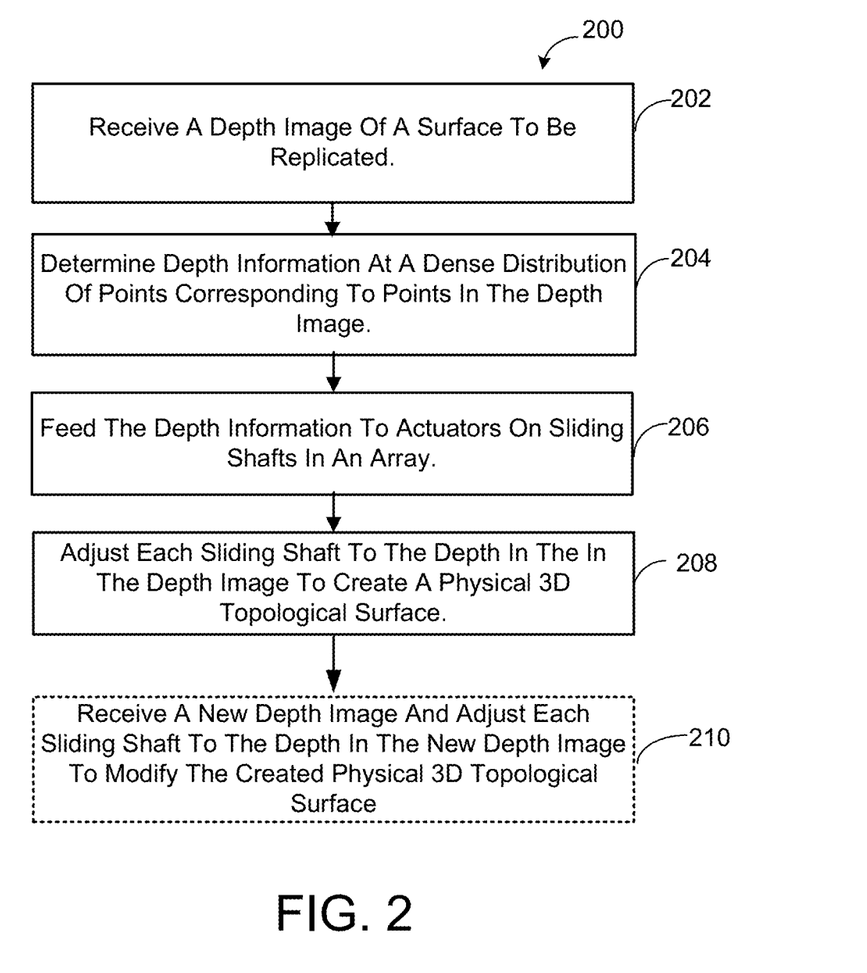
FIG. 2 depicts a flow diagram of a process for practicing one exemplary embodiment of the physical 3D renderer described herein.

FIG. 2 depicts an exemplary process 200 for practicing the physical 3D renderer described herein. The physical 3D renderer creates a physical three dimensional (3D) topological surface from one or more depth images of a surface sought to be replicated.

As shown in block 202, a depth image of a surface or structure to be replicated is received. The depth image of the surface or structure to be replicated can be taken by a camera system with a depth camera or a depth sensor (such as an exemplary camera system 500 that will be discussed in greater detail with respect to FIG. 5). The depth image can be taken, for example, from a frontal viewpoint of the surface or structure to be replicated. The surface or structure to be replicated can be, for example, a person's face or an object.

Depth information at a dense distribution of points corresponding to points in the depth image is determined, as shown in block 204. In some embodiments the camera system that captures the depth image computes this depth information.

The depth information at the dense distribution of points is fed to actuators on sliding shafts in an array that correspond to the location of the depth information, as shown in block 206. The correspondence between the depth image and the points on the array can be determined by creating a look up table for depths corresponding to locations in the depth image taken by a first camera (e.g., a frontal view camera) and comparing this look up table to a similar look up table taken from the back of the array. The depths measured by the two cameras can be compared. Any differences between the depth values in the lookup tables can be fed back to any actuator for which the two lookup tables do not agree to correct the position until the two tables agree. Hence, each sliding shaft is adjusted to the depth in the depth image to create a physical 3D topological surface or structure like the surface or structure to be replicated, as shown in block 208. In one embodiment of the physical 3D renderer more than one shaft can be controlled by each actuator.

In one embodiment of the physical 3D renderer pneumatics are used to adjust the depths of the shafts. In another embodiment of the physical 3D renderer, piezoelectric actuators are used to adjust the depth of the shafts. In yet another embodiment of the physical 3D renderer servos are used to adjust the depths of the shafts. Those with ordinary skill in the art will realize that there are many possible ways of adjusting the depth of the shafts in the array.

In one embodiment of the physical 3D renderer the spacing of the sliding shafts determines the resolution of the created 3D topological surface. When there are more shafts, located more closely together, the resolution of the created 3D topological surface will be greater and the created 3D topological surface will be able to show greater detail than if there are less shafts with greater separation between them. In one embodiment the shaft array has tight spacing to provide for high resolution. In other embodiments, for larger structures or surfaces, a servo driven assembly can be used to render these large structures or surfaces at a lower resolution.

In some embodiments of the 3D renderer the distal ends of the shafts can have end caps on them to provide for a smooth surface. The end caps can be, for example, round, or they can be square or rectangular.

In one embodiment of the physical 3D renderer, the sliding shafts are covered with a skin. The skin can serve to smooth the surface of the created 3D topological surface to closer resemble the surface to be replicated. In one embodiment of the physical 3D renderer the surface of the skin is colorized by projecting a colorized image onto the surface of the skin. For example, a color image of the surface to be replicated can be taken by a camera system at the same time the depth image is captured. The color image can then be projected on to the array or the skin of the array at the same time the created physical 3D topological surface is configured to represent the corresponding depth image.

In some embodiments of the physical 3D renderer, at least one shaft, and possibly all shafts in the array contain at least one light emitting source within the shaft to shine light from the distal end of the shaft. The light emitting source in some embodiments can emit colored light. In some embodiments of the physical 3D renderer three light sources are located in the shaft, one red, one green and one blue. This allows the created physical 3D topological surface to be colorized to any color or combinations of colors by blending the colors in each shaft in a manner similar to that used in the pixel color blending. For example, the created physical 3D topological surface can be colorized to match the colors of the surface to be replicated.

When a new depth image and/or new depth information is received the created physical 3D topological surface is updated to reflect the new depth information, as shown in block 210. In one embodiment of the 3D renderer the 3D topological surface can be updated in real-time to reflect the new depth information.

In some embodiments of the physical 3D renderer the created 3D topological surface is verified by taking one or more depth images of it and comparing these to the depth information in the depth image taken of the surface to be replicated. The one or more depth images taken of the created 3D topological surface can be taken from different viewpoints, such as, for example, from the back of the created 3D topological surface or from its side. These additional depth images can then be used to verify that the depth of the shafts correspond to the depth information from the images of the surfaces to be replicated. If there are discrepancies the depth of the sliding shafts of the created physical 3D topological surface can be adjusted to properly reflect the depth of the surface to be replicated. For example, in one embodiment each "pixel" location is measured with a depth camera from a frontal view of the rendered physical 3D topological surface and compared against the value in an image captured by another depth camera taken from the back of the rendered physical 3D topological surface. A lookup table for each image/camera can be created and compared to adjust each sliding shaft to the proper depth.

Figure 3:
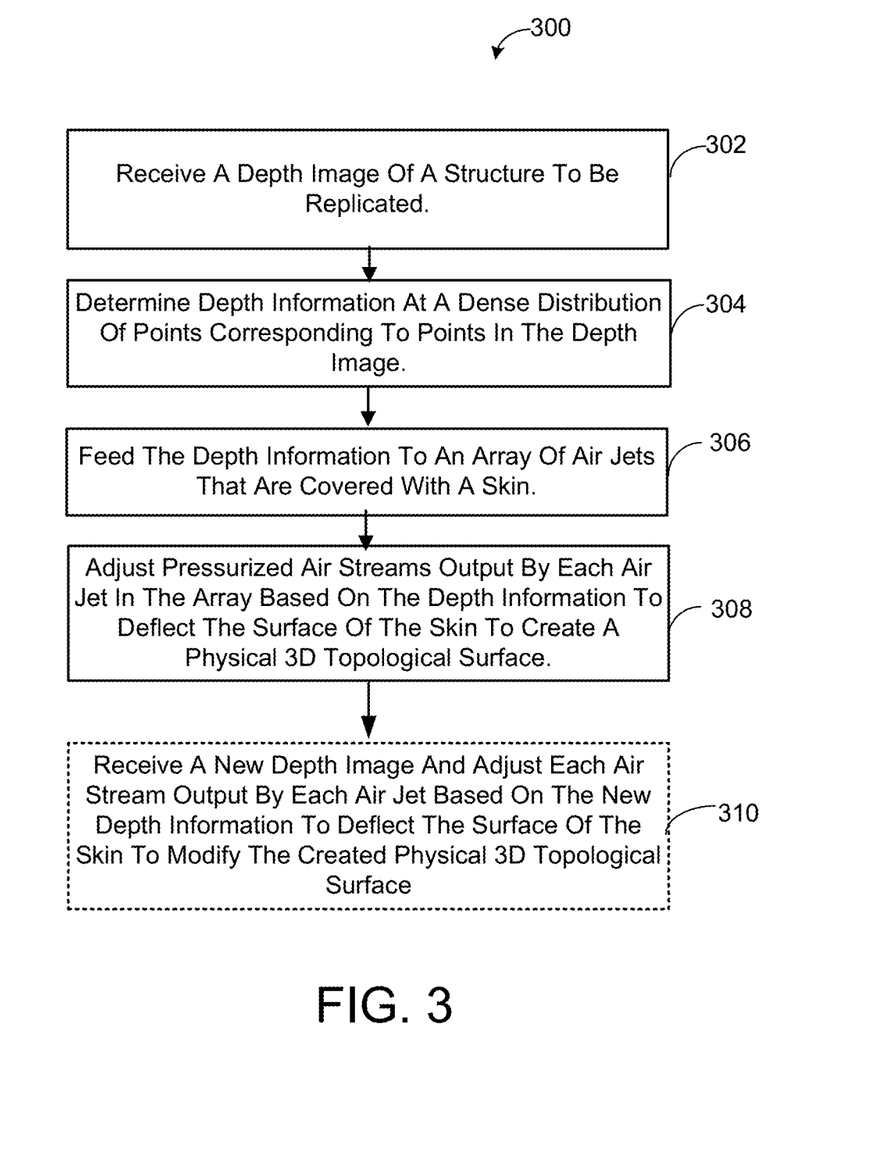
FIG. 3 depicts a flow diagram of a process for practicing another exemplary embodiment of the physical 3D renderer described herein.

FIG. 3 depicts another exemplary process 300 for practicing another embodiment of the physical 3D renderer. As shown in block 302, a depth image of a structure to be replicated is received.

The depth information at a dense distribution of points corresponding to points in the depth image is determined, as shown in block 304. The depth information is fed to an array of air jets that are covered with a skin, as shown in block 306. As shown in block 308, the pressurized air streams output by each air jet in the array are adjusted based on the depth information to deflect the surface of the skin to create the 3D topological structure. Those with ordinary skill in the art will realize that many other types of pressurized gas besides air can be used to deflect the surface of the skin.

In one embodiment of the physical 3D renderer the spacing of the jets determines the resolution of the created 3D topological surface. When there are more jets, located more closely together, the resolution of the created 3D topological surface will be greater and the created 3D topological surface will be able to show greater details than if there are less jets with greater separation between them.

In one embodiment of the physical 3D renderer the surface of the skin is colorized by projecting a colorized image onto the surface of the skin covering the air jets.

In some embodiments of the physical 3D renderer, at least one jet, and possibly all jets are associated with at least one light emitting source that shines light from each jet. The light emitting source can be colored. In some embodiments of the physical 3D renderer three light sources are located in, or associated with, each jet, for example, one red, one green and one blue. This allows the created physical 3D topological surface to be colorized to any color or combinations of colors. For example, the created physical 3D topological surface can be colorized to match the colors of the surface to be replicated. In these embodiments the skin can be slightly transparent in order to let the light shine through the skin.

When a new depth image and/or new depth information is received the physical 3D topological surface is updated to reflect the new depth information, as shown in block 310. In one embodiment of the 3D renderer the 3D topological surface can be updated in real-time to reflect the new depth information.

In some embodiments of the physical 3D renderer, one or more additional depth images can be taken of the created physical 3D topological surface to verify that the created physical 3D topological surface or structure matches the surface/structure to be replicated. This additional depth image can then be used to adjust the air pressure of the shafts that cause displacement of the skin. For example, a second depth camera or sensor can be used to obtain depth information from the front, side or back of the created physical 3D topological surface and the depth information from these images can be compared with the depth information taken of the surface to be replicated. If there are discrepancies the depth of the created physical 3D topological surface can be adjusted by adjusting the pressure of the jets.

Exemplary processes for practicing the physical 3D renderer having been described, the next section describes an exemplary system that can be used for practicing the technique.

1.2.4 An Exemplary System for Practicing the Real-Time Physical 3D Renderer

Figure 4:
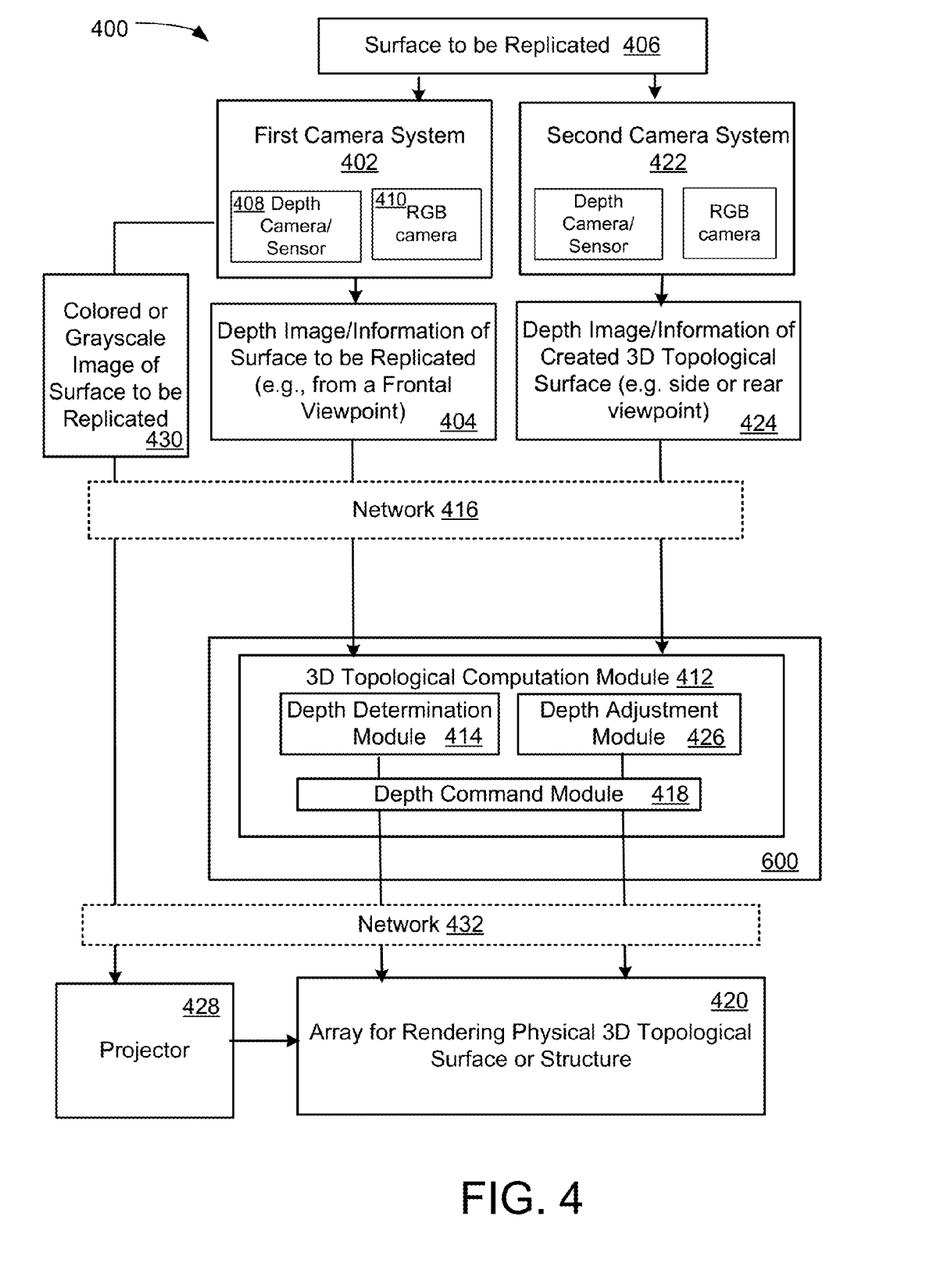
FIG. 4 depicts a schematic of a system for practicing yet another exemplary embodiment of the physical 3D renderer described herein.

FIG. 4 shows an illustrative system 400 for practicing one embodiment of the physical 3D renderer described herein. A first camera system 402 (that includes a depth camera or depth sensor 408 and optionally a RGB camera 410 or similar camera) captures a depth image (or depth information) 404 of a surface to be replicated 406. The depth information at points within the depth image may be computed by the first camera system 402, for example in an image processing module in the camera system 402. The depth information can be sent to a 3D topological computation module 412 that resides on a computing device 600, such as will be discussed in greater detail with respect to FIG. 6. Alternately, the depth image 404 of a surface to be replicated 406 can be sent to the 3D topological computation module 412 where a depth determination module 414 determines the depth information corresponding to points within the depth image. The distribution of points for which depth information is computed can be quite dense so that the topology of the created 3D physical topological surface is detailed and reflects the surface to be replicated 406. The depth image or the depth information 404 can be sent to the 3D topological computation module 412 over a network 416 and the computing device 600 on which the 3D topological computation module 412 resides can reside in a computing cloud. The captured depth image or images 404 can be transmitted to the system via a communications link, such as, for example, a WiFi link or other communications link.

Depth information of the surface to be replicated is computed for each depth image 404 received from the camera system 402. The depth information (at a dense distribution of points) is fed into the 3D topological computation module 412 where a depth command module 418 feeds the depth information at a dense distribution of points corresponding to the surface to be replicated to an array 420. The array 420 renders the physical 3D topological surface or structure so that it mimics the surface being replicated 406 as discussed previously. The array 420 can be, for example, an array of sliding shafts disposed within a housing or can be an array of pressurized air jets that deflect the surface of a skin. In the case of an array of sliding shafts, the depth information is fed to actuators on the sliding shafts in the array 420. Each sliding shaft of the array 420 is adjusted to the depth of its corresponding point or points in the depth image using the actuators to create a 3D physical topological surface like the surface to be replicated.

The rendered physical 3D topology can be verified to obtain greater accuracy by using one or more additional cameras or depth sensors to verify that the created 3D topological surface matches the topology of the surface to be replicated. For example, a second depth camera 422 can be used to capture one or more depth images 424 of the rendered physical 3D topological surface created by the array 420 and to compare these depth images with one or more images of the surface to be replicated captured by the first depth camera. Depth discrepancies between images 404, 424 taken by the two camera systems 402, 422 can be adjusted accordingly in a depth adjustment module 426 so that the created physical 3D topological surface configured by the array 420 accurately represents the surface to be replicated 406.

As discussed previously, in some embodiments of the physical 3D renderer the array 420 that creates the 3D topological surface that mimics the surface to be replicated 406 is covered with a skin. In some embodiments of the physical 3D renderer a projector 428 projects a grayscale or colored image 430 on to the array 420 (or the skin of the array) to colorize the array arranged to represent the surface to be replicated. The colored/grayscale image 430, as well as depth commands sent from the depth command module 418 can be sent over a second network 432.

1.3 Details of Various Components and Embodiments

Exemplary processes and a system for practicing the 3D physical renderer having been presented, the following paragraphs provide a more detailed description of some exemplary embodiments and components of the physical 3D renderer. These include, for example, a camera system used to capture the surface to be replicated, an array configured to represent a 3D topological surface/structure used to represent the surface to be replicated, and a projector used to colorize the array.

1.3.1 Depth Camera/Depth Sensor System

Figure 5:
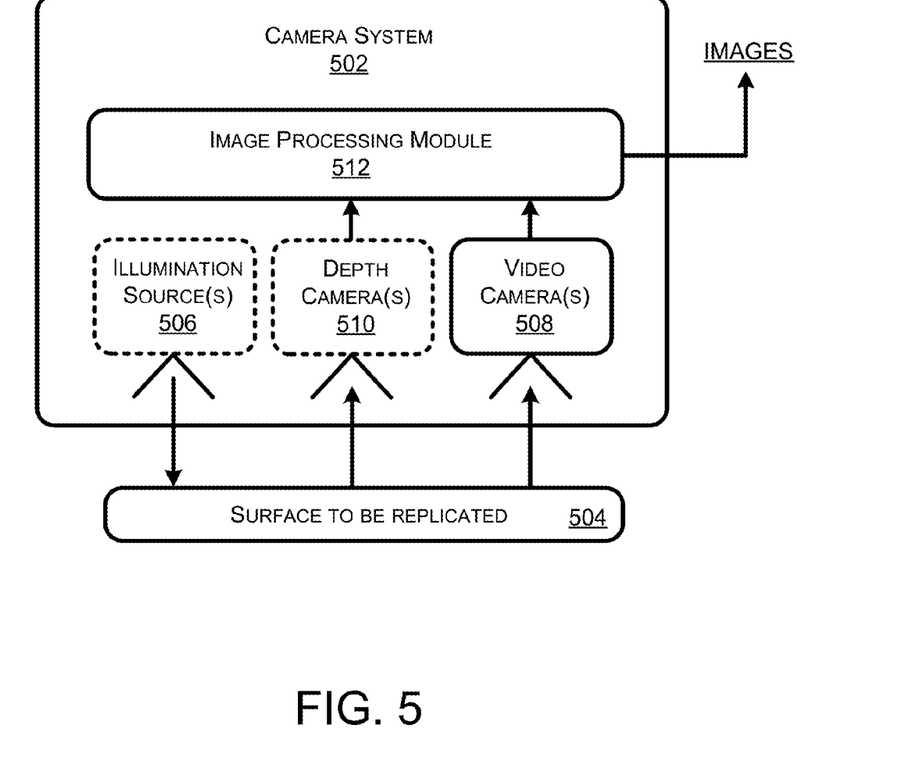
FIG. 5 shows an exemplary camera system that can be used in one embodiment of the physical 3D renderer described herein.

FIG. 5 shows an overview of one type of camera system 502 that can be used with the technique. In general, the camera system 502 can use one or more data capture techniques to capture the surface to be replicated 504. For example, the camera system 502 can investigate the surface by irradiating it using any kind electromagnetic radiation, including one or more of visible light, infrared light, radio waves, etc.

The camera system 502 can optionally include an illumination source 506 which bathes the scene in which the surface to be replicated is located in infrared light. For example, the infrared light may correspond to structured light which provides a pattern of elements (e.g., dots, lines, etc.). The structured light deforms as it is cast over the surfaces of the objects in the scene. A depth camera 510 can capture the manner in which the structured light is deformed. Based on that information, the depth camera 510 can derive the distances between different parts of the scene and the camera system 502 (for example in an image processing module 512). The depth camera can alternatively, or in addition, use other techniques to generate the depth image, such as a time-of-flight technique, a stereoscopic correspondence technique, etc.

The camera system 502 can alternatively, or in addition, capture other images of the scene. For example, a video camera 508 can capture a RGB video image of the scene or a grayscale video image of the scene containing the surface to be replicated 504.

The Kinect® controller provided by Microsoft Corporation of Redmond, Wash., can be used to implement at least parts of the external camera system.

As discussed previously in some embodiments of the physical 3D renderer one or more additional cameras are employed in order to verify the topology of the created 3D topological structure. For example, a second depth camera or sensor can be used to obtain depth information of the created physical 3D topological surface and this depth information can be compared with the depth information taken from depth images of the surface being replicated. If there are discrepancies the depths at various points in the created physical 3D topological surface can be adjusted.

1.3.2 The Array

The array used to create the 3D topological surface that represents the surface to be replicated can have various configurations. For example, in one embodiment of the physical 3D renderer the array is made of sliding shafts activated by actuators that change the depth of the shafts in the array. In another embodiment the physical 3D topological surface that represents the surface to be replicated is created by adjusting an array of pressurized air nozzles covered by a skin in order to deflect the skin in order to create the 3D topological surface. These types of array configurations are discussed in the paragraphs below. However, many other types of array configurations are possible as long as they are capable of mimicking the topology of the surface to be replicated.

1.3.2.1 An Array of Sliding Shafts

As discussed previously, in one embodiment of the physical 3D renderer the depth information from a depth image of the surface to be replicated is fed to actuators on sliding shafts in an array and each sliding shaft is adjusted to the depth in the depth image to create a physical 3D topological surface like the surface or structure to be replicated. In various embodiments of the physical 3D renderer the shafts of the array can have many different configurations. For example, the sliding shafts can have many types of cross-sections. For example, the cross-sections can be round, or the cross sections can be square or rectangular.

In one embodiment of the physical 3D renderer the spacing and cross-section of the sliding shafts determine the resolution of the created 3D topological surface. When there are more smaller shafts, located more closely together, the resolution of the created 3D topological surface will be greater and the created 3D topological surface will be able to show greater details than if there are fewer smaller shafts with greater separation between them. In one embodiment the shaft array has tight spacing to provide for high resolution. In other embodiments, for large structures or surfaces, a servo driven assembly can be used to render these large structures or surfaces at a lower resolution by using larger shaft cross-sections and/or greater shaft spacing.

In some embodiments of the 3D renderer the distal ends of the shafts can have end caps on them to provide for a smoother surface, for example, when the array is covered with a skin. The end caps can be configured in many different configurations. The end caps can be, for example, round, or they can be square or rectangular. Many different end cap configurations are possible.

The shafts of the array can be held in a housing in which they slide. The shafts are slid so that they protrude from the housing by differing amounts so as to mimic the surface to be replicated. In one embodiment of the 3D renderer pneumatics are used to adjust the depths of the shafts in the array. In another embodiment of the 3D renderer piezoelectric actuators are used to adjust the depth of the shafts in the array. In yet another embodiment of the physical 3D renderer servos are used to adjust the depths of the shafts. Those with ordinary skill in the art will realize that there are many possible ways of adjusting the depth of the shafts. In addition, in some configurations of the physical 3D renderer the multiple shafts can be controlled by one actuator. In one pneumatic embodiment, there is one air pressure source and everything is plumbed to a common network. Shafts in the array corresponding to a pixel or a group of pixels in the depth image are controlled by a computer controlled valve.

In one embodiment of the physical 3D renderer, the sliding shafts are covered with a skin. In one embodiment of the physical 3D renderer the surface of the skin is colorized by projecting a colorized image onto the surface of the skin.

In some embodiments of the physical 3D renderer, at least one shaft, and possibly all shafts contain at least one light emitting source within the shaft to shine light from the distal end of the shaft. The light emitting source can be colored. In some embodiments of the physical 3D renderer three light sources are located in the shaft, one red, one green and one blue to allow the created physical 3D topological surface to be colorized to any color or combinations of colors. For example, the created physical 3D topological surface can be colorized to match the colors of the surface to be replicated. This can be done, for example, by matching the pixel colors in a colored image of the surface being replicated to light sources within the array that are colored to match the pixel colors.

1.3.2.2 An Array of Pressurized Jets

In one embodiment of the physical 3D renderer depth information is fed to an array of air (or other type of gas) jets that are covered with a skin. Each jet can be enclosed within a compartment within the skin. The pressurized air/gas streams output by each jet in the array are adjusted based on the depth information to deflect the surface of the skin to create the 3D topological structure. Like the sliding shaft array discussed above, the air jets can be associated with colored lights which allow the array to be colorized. In one embodiment an array of air bladders is employed that has a skin covering, each bladder creates a soft point on the skin topology.

1.3.3 The Skin

As discussed previously, in many embodiments of the physical 3D renderer the array is covered with a skin. The skin that covers the array (e.g., either the shafts or the pressurized jets) provides for a smooth surface in the case of an array of shafts, while in configurations of the array that use air jets the skin provides the 3D topological structure when filled with the pressurized air or gas. In some embodiments, the skin can be made of a stretch material, such as, for example, an elastomer. In embodiments where the sliding shafts or jets of the array are equipped with lights the material used for the skin can be somewhat transparent to let the light shine through the skin. In embodiments of the physical 3D renderer that use jets with pressurized air or other gas, the skin is air tight and is attached to the housing of the array.

1.3.4 The Projector

In some embodiments of the physical 3D renderer a projector is used to project an image onto the created 3D topological structure, such as, for example, onto the skin that covers the array. The image in the projector can be sized and aligned with the array via conventional methods in order to project an image of the surface to replicated onto the created physical 3D topological surface.

2.0 EXEMPLARY USAGE SCENARIOS

The physical 3D renderer can be used in various scenarios and applications. Some exemplary usage scenarios of the many possible usage scenarios are discussed in the paragraphs below.

2.1 Tele Presence

One embodiment of the physical 3D renderer can be employed to create a physical 3D representation of a person or object at a remote location by using one or more depth images. This can allow, for example, a soldier in a remote location to feel the face of his newborn child or a surgeon assisting in a remote surgery to feel the anatomy of a person undergoing the surgery.

2.2 Simulated Topography for Training

One embodiment of the physical 3D renderer can be employed to create simulated topography for training personnel to operate in certain topographies. For example, the physical 3D topography of a landscape can be created to allow for search and rescue personnel to become familiar with remote, uncharted locations. In one embodiment, in a manner similar to search and rescue operations, embodiments of the physical 3D renderer can be employed to create a physical 3D topography of a terrain in order to train military personnel for bombing or recognizance runs.

Some embodiments of the physical 3D renderer can be used to provide various applications for the blind. For example, scenes of a movie or video can be rendered in 3D (video brail). Similarly, forms of the physical 3D renderer can be used to create a specialized e-reader that allows a blind person to read a book in brail.

Some embodiments of the physical 3D renderer can be used for gaming. For example, real 3D chess pieces can be moved by a remote player for a host player to experience.

3.0 EXEMPLARY OPERATING ENVIRONMENT

Figure 6:
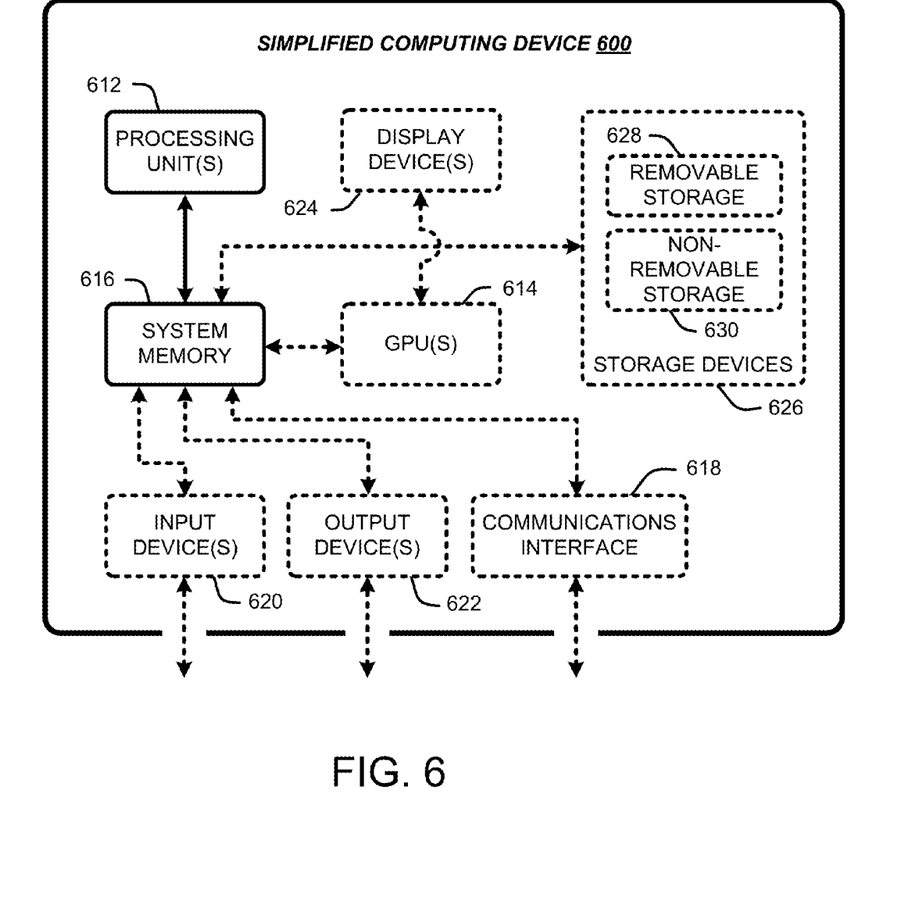
FIG. 6 is a schematic of an exemplary computing environment which can be used to practice the physical 3D renderer.

The physical 3D renderer embodiments described herein are operational within numerous types of general purpose or special purpose computing system environments or configurations. FIG. 6 illustrates a simplified example of a general-purpose computer system on which various embodiments and elements of the physical 3D renderer, as described herein, may be implemented. It is noted that any boxes that are represented by broken or dashed lines in the simplified computing device 600 shown in FIG. 6 represent alternate embodiments of the simplified computing device. As described below, any or all of these alternate embodiments may be used in combination with other alternate embodiments that are described throughout this document. The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the physical 3D renderer embodiments described herein, the device should have a sufficient computational capability and system memory to enable basic computational operations. In particular, the computational capability of the simplified computing device 600 shown in FIG. 6 is generally illustrated by one or more processing unit(s) 612, and may also include one or more graphics processing units (GPUs) 614, either or both in communication with system memory 616. Note that that the processing unit(s) 612 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 600 shown in FIG. 6 may also include other components such as a communications interface 618. The simplified computing device 600 may also include one or more conventional computer input devices 620 (e.g., pointing devices, keyboards, audio (e.g., voice) input devices, video input devices, haptic input devices, gesture recognition devices, devices for receiving wired or wireless data transmissions, and the like). The simplified computing device 600 may also include other optional components such as one or more conventional computer output devices 622 (e.g., display device(s) 624, audio output devices, video output devices, devices for transmitting wired or wireless data transmissions, and the like). Note that typical communications interfaces 618, input devices 620, output devices 622, and storage devices 626 for general-purpose computers are well known to those skilled in the art, and will not be described in detail herein.

The simplified computing device 600 shown in FIG. 6 may also include a variety of computer-readable media. Computer-readable media can be any available media that can be accessed by the computer 600 via storage devices 626, and can include both volatile and nonvolatile media that is either removable 628 and/or non-removable 630, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various physical 3D renderer embodiments described herein, or portions thereof, may be stored, received, transmitted, or read from any desired combination of computer-readable or machine-readable media or storage devices and communication media in the form of computer-executable instructions or other data structures.

Finally, the physical 3D renderer embodiments described herein may be further described in the general context of computer-executable instructions, such as program modules, being executed by a computing device. Generally, program modules include routines, programs, objects, components, data structures, and the like, that perform particular tasks or implement particular abstract data types. The physical 3D renderer embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

4.0 OTHER EMBODIMENTS

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for creating a physical three dimensional (3D) topological surface from one or more images, comprising:
   receiving a depth image of a surface to be replicated;
   determining depth information at a dense distribution of points corresponding to points in the depth image so that the physical 3D topological surface that is replicated reflects the surface to be replicated;
   feeding the depth information to actuators on sliding shafts in an array so that each sliding shaft is adjusted to the depth in the depth image to create the physical 3D topological surface that changes in real time as the surface to be replicated changes;
   verifying the created physical 3D topological surface by comparing a depth image of the created physical 3D topological surface to a depth image of the surface to be replicated; and
   correcting any discrepancies between the depth image of the surface to be replicated and the depth image of the created physical 3D topological surface by adjustments to the created physical 3D topological surface.

2. The computer-implemented process of claim 1 wherein the created 3D topological surface changes when a new depth image is received.

3. The computer-implemented process of claim 1 wherein adjustments to the created physical 3D topological surface are made by adjusting the sliding shafts.

4. The computer-implemented process of claim 1 wherein the created 3D topological surface is covered with a skin.

5. The computer-implemented process of claim 4, further comprising projecting a colored image of the surface to be replicated onto the skin to colorize the created 3D topological surface.

6. The computer-implemented process of claim 1 wherein pneumatics are used to adjust the depths of the shafts.

7. The computer-implemented process of claim 1 wherein piezoelectric actuators are used to adjust the depths of the shafts.

8. The computer-implemented process of claim 1 wherein servos are used to adjust the depths of the shafts.

9. The computer-implemented process of claim 1, wherein there are multiple actuators, each actuator controlling one shaft.

10. The computer-implemented process of claim 9 wherein the depth image of the created 3D topological surface captures the back of the created 3D topological surface.

11. The computer-implemented process of claim 1, wherein the surface to be replicated is a physical surface.

12. The computer-implemented process of claim 1 wherein the spacing of the sliding shafts determine the resolution of the created 3D topological surface.

13. The computer-implemented process of claim 1 wherein the distal ends of the shafts further comprise an end cap.

14. The computer-implemented process of claim 1 wherein at least one shaft further comprises at least one light emitting source within the shaft to shine light from the distal end of the shaft.

15. The computer-implemented process of claim 14 wherein the light emitting source produces light of different colors.

16. The computer-implemented process of claim 15 wherein the created 3D topological surface can be colored using the light of different colors to replicate the colors of the surface to be replicated.

17. The computer-implemented process of claim 1 wherein more than one shaft can be controlled by an actuator.

18. A process for creating a physical 3D topological structure from images, comprising:
receiving a depth image of a structure to be replicated;
determining depth information at a dense distribution of points corresponding to points in the depth image so that the physical 3D topological structure that is replicated reflects the structure to be replicated;
feeding the depth information to an array of air jets that are covered with a skin;
adjusting pressurized air streams output by each air jet in the array based on the depth information to deflect the surface of the skin to create the physical 3D topological structure in real-time;
verifying the created physical 3D topological structure by measuring the deflections to the surface of the skin corresponding to physical 3D topological structure and comparing the measured deflections to the fed depth information; and
correcting any discrepancies between the measured deflections to the surface of the skin and the fed depth information by adjusting the pressurized air streams output by one or more air jets.

19. A system for creating a physical 3D topological structure from images, comprising:
a first depth camera that captures depth images of a structure to be replicated;
a processor that determines the depth information at a dense distribution of points corresponding to points in a depth image captured by the first camera;
actuators on sliding shafts in an array that receive the depth information captured by the first camera and adjust each sliding shaft to the depth in the depth image to create the physical 3D topological structure like the structure to be replicated; and
a second depth camera that captures depth images of the created physical 3D topological structure in order to verify that the created physical 3D topological structure accurately represents the structure to be replicated,
wherein discrepancies between the depth image of the surface to be replicated and the depth image of the created physical 3D topological surface are corrected by adjustments to the created physical 3D topological surface using the actuators.

20. The system of claim 19 wherein the created physical 3D topological surface changes when a new depth image is received by either the first depth camera or the second depth camera.

* * * * *